United States Patent
Takamori

(10) Patent No.: US 9,583,763 B2
(45) Date of Patent: Feb. 28, 2017

(54) LITHIUM COMPOSITE METAL OXIDE, POSITIVE ELECTRODE ACTIVE SUBSTANCE, POSITIVE ELECTRODE, AND NON-AQUEOUS ELECTROLYTE SECONDARY BATTERY

(71) Applicant: SUMITOMO CHEMICAL COMPANY, LIMITED, Tokyo (JP)

(72) Inventor: Kenji Takamori, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/408,487

(22) PCT Filed: Jun. 28, 2013

(86) PCT No.: PCT/JP2013/068452
§ 371 (c)(1),
(2) Date: Dec. 16, 2014

(87) PCT Pub. No.: WO2014/007358
PCT Pub. Date: Jan. 9, 2014

(65) Prior Publication Data
US 2015/0188132 A1   Jul. 2, 2015

(30) Foreign Application Priority Data

Jul. 6, 2012   (JP) .................. 2012-153048

(51) Int. Cl.
*H01M 4/505* (2010.01)
*H01M 4/525* (2010.01)
(Continued)

(52) U.S. Cl.
CPC ............ *H01M 4/505* (2013.01); *C01G 53/50* (2013.01); *H01M 4/525* (2013.01);
(Continued)

(58) Field of Classification Search
CPC .... H01M 4/505; H01M 4/525; H01M 10/052; H01M 2004/021; C01G 53/50; C01P 2002/72
See application file for complete search history.

(56) References Cited

U.S. PATENT DOCUMENTS

2009/0011334 A1   1/2009   Shizuka et al.
2009/0280412 A1   11/2009   Imanari et al.
(Continued)

FOREIGN PATENT DOCUMENTS

CN   102386389 A   3/2012
JP   2004-323331 A   11/2004
(Continued)

OTHER PUBLICATIONS

Communication dated Sep. 16, 2015, issued by the State Intellectual Property Office of the P.R.C. in corresponding Chinese Application No. 201380033640.6.
(Continued)

*Primary Examiner* — Ula C Ruddock
*Assistant Examiner* — Thomas Parsons
(74) *Attorney, Agent, or Firm* — Sughrue Mion, PLLC

(57) ABSTRACT

A lithium composite metal oxide that contains Li, Ni, and Mn, has a layered structure, has a diffraction peak in a range of $2\theta=20.8\pm1°$ in a powder X-ray diffraction pattern obtained with powder X-ray diffraction measurement using a Cu—Kα radiation, has a BET specific surface area in a range of 6 $m^2/g$ to 30 $m^2/g$, and has an average particle diameter measured with a laser diffraction scattering method in a range of 0.1 μm to 10 μm.

7 Claims, 1 Drawing Sheet

(51) Int. Cl.
*H01M 10/052* (2010.01)
*C01G 53/00* (2006.01)
*H01M 4/02* (2006.01)

(52) U.S. Cl.
CPC ...... *C01P 2002/72* (2013.01); *C01P 2004/61* (2013.01); *C01P 2006/12* (2013.01); *H01M 10/052* (2013.01); *H01M 2004/021* (2013.01); *H01M 2220/30* (2013.01); *Y02E 60/122* (2013.01)

(56) References Cited

U.S. PATENT DOCUMENTS

| | | |
|---|---|---|
| 2012/0217435 A1 | 8/2012 | Yamamoto et al. |
| 2013/0318780 A1 | 12/2013 | Tsunozaki et al. |
| 2013/0327979 A1 | 12/2013 | Modeki et al. |

FOREIGN PATENT DOCUMENTS

| | | | |
|---|---|---|---|
| JP | 2008-98154 A | | 4/2008 |
| JP | 2009-245955 A | | 10/2009 |
| JP | 2010-030808 A | | 2/2010 |
| JP | 2011096650 | * | 5/2011 |
| JP | 2011-134708 A | | 7/2011 |
| WO | 2011/040383 A1 | | 4/2011 |
| WO | 2012/108513 A1 | | 8/2012 |
| WO | 2012/111614 A1 | | 8/2012 |

OTHER PUBLICATIONS

Communication dated Jul. 19, 2016 from the Japanese Patent Office in counterpart Application No. 2016-107071.
Communication dated Jul. 19, 2016 from the Japanese Patent Office in counterpart Application No. 2014-523799.

* cited by examiner

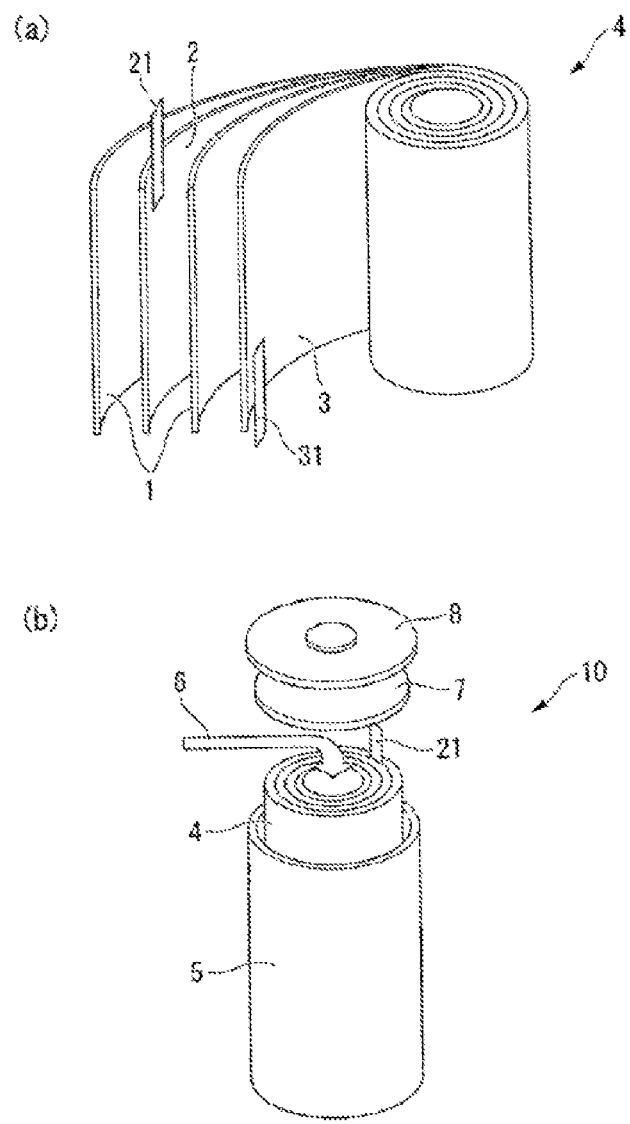

LITHIUM COMPOSITE METAL OXIDE, POSITIVE ELECTRODE ACTIVE SUBSTANCE, POSITIVE ELECTRODE, AND NON-AQUEOUS ELECTROLYTE SECONDARY BATTERY

CROSS REFERENCE TO RELATED APPLICATIONS

This application is a National Stage of International Application No. PCT/JP2013/068452 filed Jun. 28, 2013, claiming priority based on Japanese Patent Application No. 2012-153048 filed Jul. 6, 2012, the contents of all of which are incorporated herein by reference in their entirety.

TECHNICAL FIELD

The present invention relates to a lithium composite metal oxide, a positive electrode active material, a positive electrode, and a non-aqueous electrolyte secondary battery.

BACKGROUND ART

A lithium composite metal oxide is used as a positive electrode active material in a non-aqueous electrolyte secondary battery such as a lithium secondary battery. The lithium secondary battery has already been put into practical use as a small size power supply for mobile phones, notebook computers, etc., and furthermore, there has been an attempt to utilize the lithium secondary battery as a medium or large size power supply for automobiles, power storage, etc.

Recently, with downsizing and multifunctioning portable devices, there has been an increasing demand for a non-aqueous electrolyte secondary battery having a high energy density, and the development of a non-aqueous electrolyte secondary batteries in excellent characteristics is more desired than ever.

As an existing lithium composite metal oxide, Patent literature 1 concretely discloses a lithium composite metal oxide which has a composition of Li:Mn:Ni:Co=1.06:0.43:0.34:0.16 and a BET specific surface area of 1.16 m²/g, and which exhibits a discharge capacity of 197.4 mAh/g when it is used as a positive electrode active material for a lithium secondary battery.

REFERENCE LIST

Patent Literature

[Patent Literature 1] Japanese Patent Application Publication No. 2009-245955

SUMMARY OF INVENTION

A non-aqueous electrolyte secondary battery obtained with using the existing lithium composite metal oxide as described above as a positive electrode active material, however, is not sufficient one for the use in which a high discharge capacity is required, for example, a small size power supply used in a downsizing and multifunctioning portable device.

In addition, while the existing non-aqueous electrolyte secondary battery is designed to be driven with an upper limit voltage of approximately 4.3 V relative to lithium as the reference, in recent years, there has been an attempt to increase the capacity of the non-aqueous electrolyte secondary battery by driving a battery with a higher voltage than usual, that is, an upper limit voltage of approximately 4.6 V to 4.8 V relative to lithium as the reference. Therefore, there has been a demand for a positive electrode active material for a non-aqueous electrolyte secondary battery capable of being driven with such a higher voltage.

Furthermore, as an index for evaluating the performance of a secondary battery, the initial coulomb efficiency is known. The "initial coulomb efficiency" refers to a value obtained from (initial discharge capacity)/(initial charge capacity)×100 (%). Since a secondary battery having a high initial coulomb efficiency has a small irreversible capacity at the time of initial charge and discharge, and tends to have a greater capacity per volume and weight, a secondary battery exhibiting as high an initial coulomb efficiency as possible is desired.

The present invention has been made in consideration of the above-described circumstances, and an object of the present invention is to provide a lithium composite metal oxide used in a non-aqueous electrolyte secondary battery capable of increasing the discharge capacity and the initial coulomb efficiency at a higher upper limit voltage than usual. In addition, another object is to provide a positive electrode active material, a positive electrode, and a non-aqueous electrolyte secondary battery for which the above-described lithium composite metal oxide is used.

In order to solve the above-described problems, an aspect of the present invention provides a lithium composite metal oxide which contains Li, Ni, and Mn, has a layered structure, has a diffraction peak in a range of $2\theta=20.8\pm1°$ in a powder X-ray diffraction pattern obtained with powder X-ray diffraction measurement using a Cu—Kα radiation, has a BET specific surface area in a range of 6 m²/g to 30 m²/g, and has an average particle diameter measured with a laser diffraction scattering method in a range of 0.1 μm to 10 μm.

In other aspect of the present invention, an average primary particle diameter of the lithium composite metal oxide is preferably in a range of 0.05 μm to 0.3 μm.

In other aspect of the present invention, the lithium composite metal oxide is preferably expressed by Formula (A) described below

$$Li_aNi_{1-x-y}Mn_xM_yO_2 \quad\quad (A)$$

(Here, $1.1 \leq a \leq 1.6$, $0.4 \leq x \leq 0.8$, $0 \leq y \leq 0.25$, $0.5 \leq x+y \leq 0.8$, and M represents one or more elements selected from the group consisting of Co, Fe, Mg, Al, and Ca).

In other aspect of the present invention, the lithium composite metal oxide is preferably expressed by Formula (B) described below

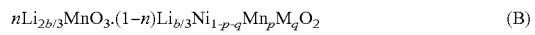
$$nLi_{2b/3}MnO_3 \cdot (1-n)Li_{b/3}Ni_{1-p-q}Mn_pM_qO_2 \quad\quad (B)$$

(Here, $0.2 \leq n \leq 0.6$, $2.75 \leq b < 3.0$, $0.25 \leq p \leq 0.5$, $0 \leq q \leq 0.31$, $0.38 \leq p+q \leq 0.5$, and M represents one or more elements selected from the group consisting of Co, Fe, Mg, Al, and Ca).

In other aspect of the present invention, the M in Formulae (A) and (B) are preferably either one of or both of Co and Fe.

In addition, other aspect of the present invention is a positive electrode active material comprising the lithium composite metal oxide.

In addition, other aspect of the present invention is a positive electrode comprising the positive electrode active material.

In addition, other aspect of the present invention is a non-aqueous electrolyte secondary battery comprising a negative electrode and the positive electrode.

In the aspect of the present invention, a charge potential of the positive electrode in a fully charged state is preferably 4.35 V (vs. Li/Li$^+$) or more.

BRIEF DESCRIPTION OF DRAWINGS

FIG. 1(a) and FIG. 1(b) are schematic view illustrating an example of a non-aqueous electrolyte secondary battery of the present embodiment.

REFERENCE SIGNS LIST

1 . . . SEPARATOR, 2 . . . POSITIVE ELECTRODE, 3 . . . NEGATIVE ELECTRODE, 4 . . . ELECTRODE GROUP, 5 . . . BATTERY CAN, 6 . . . ELECTROLYTE SOLUTION, 7 . . . TOP INSULATOR, 8 . . . SEALING BODY, 10 . . . NON-AQUEOUS ELECTROLYTE SECONDARY BATTERY, 21 . . . POSITIVE ELECTRODE LEAD, 31 . . . NEGATIVE ELECTRODE LEAD

DESCRIPTION OF EMBODIMENTS

[Lithium Composite Metal Oxide]

A lithium composite metal oxide of the present embodiment contains Li, Ni, and Mn, has a layered structure, has a diffraction peak in a range of 2θ=20.8±1° in a powder X-ray diffraction pattern obtained with powder X-ray diffraction measurement using a Cu—Kα radiation, has a BET specific surface area in a range of 6 m$^2$/g to 30 m$^2$/g, and has an average particle diameter measured with a laser diffraction scattering method in a range of 0.1 μm to 10 μm.

Hereinafter, what has been described above will be sequentially described.

(Layered Structure)

The crystal structure of the lithium composite metal oxide of the present embodiment is a layered structure, and is more preferably a hexagonal crystal structure or a monoclinic crystal structure.

The hexagonal crystal structure belongs to any one of the space group selected from the group consisting of P3, P3$_1$, P3$_2$, R3, P-3, R-3, P312, P321, P3$_1$12, P3$_1$21, P3$_2$12, P3$_2$21, R3$_2$, P3 ml, P31m, P3c1, P31c, R3m, Ric, P-31m, P-31c, P-3 ml, P-3c1, P-3m, R-3c, P6, P6$_1$, P6$_5$, P6$_2$, P6$_4$, P6$_3$, P-6, P6/m, P6$_3$/m, P622, P6$_1$22, P6$_5$22, P6$_2$22, P6$_4$22, P6$_3$22, P6 mm, P6cc, P6$_3$ cm, P6$_3$mc, P-6m2, P-6c2, P-62m, P-62c, P6/mmm, P6/mcc, P6$_3$/mcm, and P6$_3$/mmc.

In addition, the monoclinic crystal structure belongs to any one of the space group selected from the group consisting of P2, P2$_1$, C2, Pm, Pc, Cm, Cc, P2/m, P2$_1$/m, C2/m, P2/c, P2$_1$/c, and C2/c.

Among the above-described crystal structures, since the discharge capacity of the obtained non-aqueous electrolyte secondary battery increases, the particularly preferable crystal structure of the lithium composite metal oxide is a hexagonal crystal structure belonging to R-3m or a monoclinic crystal structure belonging to C2/m.

The space group of the lithium composite metal oxide of the present embodiment can be confirmed using the following method.

First, powder X-ray diffraction measurement in which Cu—Kα, is used as a radiation source and the measurement range of a diffraction angle 2θ is set in a range of 10° to 90° is carried out on the lithium composite metal oxide, subsequently, Rietveld analysis is carried out on the basis of the result (the obtained powder X-ray diffraction pattern), and the crystal structure which the lithium composite metal oxide has and the space group in the crystal structure are determined. The Rietveld analysis is a method in which the crystal structure of a material is analyzed using the data of diffraction peaks (diffraction peak intensity and diffraction angle 2θ) in the powder X-ray diffraction measurement of the material, and a method that has been conventionally used (for example, refer to "Practice of powder X-ray analysis—Introduction to the Rietveld method" published on Feb. 10, 2002, and edited by Conference for X-ray analysis in The Japan Society for Analytical Chemistry).

(Diffraction Peak in Powder X-Ray Diffraction Diagram)

The lithium composite metal oxide of the present embodiment has a diffraction peak in a range of 2θ=20.8±1°, that is, in a range of 19.8°≤2θ≤21.8° in the powder X-ray diffraction pattern obtained with the powder X-ray diffraction measurement using a Cu—Kα radiation.

As described above, the crystal of the lithium composite metal oxide of the present embodiment has a layered structure. When the lithium composite metal oxide having a layered structure is expressed as LiMO$_2$, individual layers can be schematically divided into (1) a layer constituted of a Li ion, (2) a layer constituted of an oxygen (O) ion, and (3) a layer constituted of a metal (M) ion other than the Li ion (hereinafter, the layer of (3) may be, in some cases, referred to as "metal ion layer"). When a non-aqueous electrolyte secondary battery is constituted using the above-described lithium composite metal oxide as a positive electrode active material, the Li ion in (1) the layer constituted of the Li ion is mainly emitted from the crystal or absorbed in the crystal, and the non-aqueous electrolyte secondary battery is charged and discharged.

Here, in the lithium composite metal oxide of the present embodiment, the diffraction peak appearing in the range of 2θ=20.8±1° in the powder X-ray diffraction pattern indicates that the crystal of the measured lithium composite metal oxide has a long-distance order. Specifically, the diffraction peak indicates that a Li ion is present in (3) the metal ion layer (the metal ion layer includes a Li ion), and the above-described metal ion layer is periodically present over a long distance, and therefore the diffraction peak appears in the above-described range. In the lithium composite metal oxide having the above-described structure, since the Li ion used for charging and discharging is included not only in (1) the layer constituted of a Li ion but also in (3) the metal ion layer, the capacity of the non-aqueous electrolyte secondary battery is increased using the lithium composite metal oxide as a positive electrode active material.

In the non-aqueous electrolyte secondary battery using the lithium composite metal oxide of the present embodiment, in order to obtain a high discharge capacity, the diffraction peak in the range of 2θ=20.8±1° in the powder X-ray diffraction pattern obtained with the powder X-ray diffraction measurement using a Cu—Kα radiation has a value obtained by dividing the maximum intensity of the peak by the maximum intensity of a diffraction peak in a range of 2θ=18.6±1° (17.6°≤2θ≤19.6°), preferably in a range of 0.03 to 20, and more preferably in a range of 0.05 to 10.

(BET Specific Surface Area)

The BET specific surface area of the lithium composite metal oxide of the present embodiment is in a range of 6 m$^2$/g to 30 m$^2$/g. When the BET specific surface area is 6 m$^2$/g or more, the discharge capacity of the obtained non-aqueous electrolyte secondary battery is favorable, and, when the BET specific surface area is 30 m$^2$/g or less, the cycle characteristics (the capacity maintenance rate when the battery is repeatedly charged and discharged) of the obtained non-aqueous electrolyte secondary battery are favorable. Therefore, the lithium composite metal oxide of the present embodiment become excellent in the discharge capacity and cycle characteristics of the obtained non-aqueous electrolyte secondary battery.

In order to further improve the effects of the present embodiment, the BET specific surface area of the lithium composite metal oxide is preferably 7 m$^2$/g or more, and more preferably 9 m$^2$/g or more. In addition, in order to improve the filling properties, the BET specific surface area of the lithium composite metal oxide is preferably 25 m$^2$/g or less, and more preferably 20 m$^2$/g or less. The above-described upper limit value and lower limit value may be adequately combined together.

(Average Particle Diameter)

The average particle diameter of the lithium composite metal oxide of the present embodiment is in a range of 0.1 μm to 10 μm, and preferably in a range of 0.1 μm to less than 10 μm. By this, it is possible to increase the capacity maintenance rate (cycle characteristics) when the battery is repeatedly charged and discharged and the discharge capacity maintenance rate at a high current rate. The average particle diameter of the lithium composite metal oxide is more preferably in a range of 0.2 μm to 5 μm, and still more preferably in a range of 0.3 μm to 1 μm.

In the present embodiment, the "average particle diameter" of the lithium composite metal oxide refers to a value measured by the following method (a laser diffraction scattering method).

First, 0.1 g of lithium composite metal oxide powder is put into 50 ml of a 0.2 mass % sodium hexametaphosphate aqueous solution, and a dispersion liquid in which the powder is dispersed is obtained. The particle size distribution of the obtained dispersion liquid is measured using a MASTERSIZER 2000 (a laser diffraction scattering particle size distribution measuring instrument) manufactured by Malvern Instruments Ltd., and a volume-based cumulative particle size distribution curve is obtained. In the obtained cumulative particle size distribution curve, the value of the particle diameter ($D_{50}$) from the micro particle side at the point of 50% accumulation is the average particle diameter of the lithium composite metal oxide.

(Other Characteristics)

In order that the lithium composite metal oxide of the present embodiment obtains a high initial coulomb efficiency, the average primary particle diameter of the lithium composite metal oxide is preferably in a range of 0.05 μm to 0.3 μm, and more preferably in a range of 0.07 μm to 0.25 μm.

In the present embodiment, the "average primary particle diameter" of the lithium composite metal oxide refers to a value measured by the following method.

First, lithium composite metal oxide powder is placed on a conductive sheet attached onto a sample stage, and SEM observation is carried out by radiating an electron beam with an accelerated voltage of 20 kV using a JSM-5510 manufactured by JEOL Ltd. 50 primary particles are arbitrarily selected in an image (SEM photograph) obtained from the SEM observation, parallel lines are drawn from a certain direction so as to hold the projection image of each primary particle, and the distance (unidirectional particle diameter) between the parallel lines is measured as the particle diameter of the primary particle. The arithmetic average value of the obtained particle diameters of the primary particles is the average primary particle diameter of the lithium composite metal oxide.

In addition, the "average secondary particle diameter" of the secondary particles of the lithium composite metal oxide refers to the arithmetic average value of the particle diameters of secondary particles measured by the same method as the above-described method for measuring the average primary particle diameter.

(Composition Formula of Lithium Composite Metal Oxide)

In order to obtain a non-aqueous electrolyte secondary battery having a higher discharge capacity, the lithium composite metal oxide of the present embodiment is preferably expressed by Formula (A) described below.

$$Li_aNi_{1-x-y}Mn_xM_yO_2 \quad (A)$$

(Here, 1.1≤a≤1.6, 0.4≤x≤0.8, 0.5≤x+y≤0.8, and M represents one or more elements selected from the group consisting of Co, Fe, Mg, Al, and Ca).

Alternatively, the lithium composite metal oxide of the present embodiment is preferably expressed by Formula (B) described below.

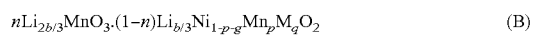

$$nLi_{2b/3}MnO_3 \cdot (1-n)Li_{b/3}Ni_{1-p-q}Mn_pM_qO_2 \quad (B)$$

(Here, 0.2≤n≤0.6, 2.75≤b<3.0, 0.25≤p≤0.5, 0≤q≤0.31, 0.38≤p+q≤0.5, and M represents one or more elements selected from the group consisting of Co, Fe, Mg, Al, and Ca).

In Formulae (A) and (B), in order to increase the discharge capacity and obtain a non-aqueous electrolyte secondary battery having a high initial coulomb efficiency, the molar ratio of Li/(Mn+Ni+M) is preferably in a range of 1.1 to 1.6, and more preferably in a range of 1.15 to 1.5.

In Formulae (A) and (B), in the case of a non-aqueous electrolyte secondary battery being obtained, to increase the capacity maintenance rate when the battery is repeatedly charged and discharged (cycle characteristics), the molar ratio of Mn/(Mn+Ni+M) is preferably in a range of 0.4 to 0.8, and more preferably in a range of 0.45 to 0.7.

In Formulae (A) and (B), in the case of a non-aqueous electrolyte secondary battery being obtained, to increase the discharge capacity maintenance rate at a high discharge rate, the molar ratio of Ni/(Mn+Ni+M) is preferably in a range of 0.2 to 0.5, and more preferably in a range of 0.25 to 0.45.

In Formulae (A) and (B), in the case of a non-aqueous electrolyte secondary battery being obtained, to increase the average discharge voltage, the molar ratio of M/(Mn+Ni+M) is preferably in a range of 0 to 0.25, and more preferably in a range of 0.03 to 0.20.

In Formulae (A) and (B), to increase the average discharge voltage, the M is preferably Co, Fe, Mg, Al, or Ca and particularly preferably Co or Fe. The M may be singly used, or a mixture of two or more Ms may be used.

In Formula (B), to increase the discharge capacity in the case of a non-aqueous electrolyte secondary battery being obtained, n is preferably 0.2 or more, and more preferably 0.25 or more. In addition, to obtain a non-aqueous electrolyte secondary battery having a high initial coulomb efficiency, n is preferably 0.6 or less, and more preferably 0.5 or less. The above-described upper limit value and lower limit value may be adequately combined together.

A positive electrode active material including the lithium composite metal oxide of the present embodiment is preferable for a non-aqueous electrolyte secondary battery.

(Method for Producing Lithium Composite Metal Oxide)

Next, the method for producing the lithium composite metal oxide will be described.

The lithium composite metal oxide of the present embodiment has a diffraction peak in a range of 2θ=20.8±1° in a powder X-ray diffraction pattern obtained with powder X-ray diffraction measurement using a Cu—Kα radiation. In order to obtain the above-described lithium composite metal oxide, at the time of production, it is preferable to use a greater amount of a material corresponding to Li than materials corresponding to metals other than Li, and to increase the amount (molar ratio) of Li with respect to the metals other than Li included in a mixture before heating described below.

An example of the method for producing the lithium composite metal oxide of the present embodiment is a method including the following steps (1), (2), and (3) in this order.

(1) A step of obtaining a slurry by bringing an aqueous solution (hereinafter, in some cases, referred to as "raw material aqueous solution") including a Ni ion, a Mn ion, and an ion of a metal represented by M and alkali into contact with each other to generate a co-precipitate.

(2) A step of obtaining a co-precipitate from the slurry obtained in (1).

(3) A step of heating a mixture obtained by mixing the co-precipitate obtained in (2) and a lithium compound at a temperature in a range of 650° C. to 950°.

(Step (1))

In the step (1), the raw material aqueous solution may be prepared by dissolving a compound containing Ni and a compound containing Mn in water. The compound containing Ni and the compound containing Mn are preferably water-soluble salts, and more preferably sulfates.

Similarly, a compound containing M (one or more elements selected from the group consisting of Co, Fe, Mg, Al, and Ca) that is used in for preparing the raw material aqueous solution is preferably a water-soluble salt. Particularly, when M is either of or both of Fe and Co, a sulfate of M is preferably used, and a divalent sulfate is more preferable.

The raw material aqueous solution is preferably an aqueous solution obtained by dissolving a sulfate of Ni, a sulfate of Mn, and a sulfate of M in water.

When each raw material containing Ni, Mn, or M are not easily dissolved in water, for example, when each raw material is an oxide, a hydroxide, and a metal material, it is possible to obtain the raw material aqueous solution by dissolving these raw materials in an aqueous solution containing sulfuric acid.

The raw material aqueous solution may be prepared by preparing separately aqueous solutions for individual metals used, and then mixing all the aqueous solutions, or may be prepared by dissolving a compound containing Ni, Mn, and M in a commonly used solvent (water or sulfuric acid).

The alkali used in the step (1) may be one or more salts selected from the group consisting of LiOH (lithium hydroxide), NaOH (sodium hydroxide), KOH (potassium hydroxide), $Li_2CO_3$ (lithium carbonate), $Na_2CO_3$ (sodium carbonate), $K_2CO_3$ (potassium carbonate), and $(NH_4)_2CO_3$ (ammonium carbonate). The alkali used may be an anhydride or a hydrate. An anhydride and a hydrate may be jointly used. In the step (1), an aqueous solution of the above-described alkali (alkali aqueous solution) is preferably used. As the alkali aqueous solution, it is also possible to use ammonia water.

The concentration of the alkali in the alkali aqueous solution is preferably in a range of approximately 0.5 M to 10 M (mol/L), and more preferably in a range of approximately 1 M to 8 M. In addition, inform the viewpoint of the production costs, NaOH or KOH is preferably used as the alkali. In addition, two or more alkalis described above may be jointly used.

Examples of the contact method in the step (1) include (i) a method in which the alkali aqueous solution is added to and mixed with the raw material aqueous solution, (ii) a method in which the raw material aqueous solution is added to and mixed with the alkali aqueous solution, and (iii) a method in which the raw material aqueous solution and the alkali aqueous solution are added to and mixed with water. During the mixing, stirring is preferably carried out.

Among the contact methods in the step (1), (ii) the method in which the raw material aqueous solution is added to and mixed with the alkali aqueous solution is preferable since it is easy to control the change in pH. In the case of this method, as the raw material aqueous solution is added to and mixed with the alkali aqueous solution, the pH of the alkali aqueous solution tends to decrease, and it is preferable to add the raw material aqueous solution with controlling the pH to be 9 or more, and preferably to be 10 or more. In addition, when the aqueous solutions are brought into contact with each other with maintaining a temperature of either or both of the raw material aqueous solution and the alkali aqueous solution in a range of 40° C. to 80° C., a co-precipitate having a more homogeneous composition can be preferably obtained.

In the step (1), by bringing the raw material aqueous solution and the alkali into contact with each other in the above-described manner, it is possible to co-precipitate and generate a salt including a Ni ion, a Mn ion, and an ion of a metal represented by M and to obtain a slurry in which the salt that is a co-precipitate is dispersed, (Step (2))

In the step (2), a co-precipitate is obtained from the slurry obtained in the step (1). In the step (2), a variety of methods may be employed as a method for obtaining the co-precipitate as long as the co-precipitate can be obtained, and a method by a separation operation which produces a solid component such as filtration is preferable since the operation is simple. The co-precipitate may be obtained by a method in which liquid is volatilized by heating such as the spraying and drying of the slurry.

In the case of obtaining the co-precipitate in the step (2), it is preferable to wash and dry the co-precipitate separated in the step (2). By washing the co-precipitate, it is possible to reduce the amount of an alkali remaining in the obtained co-precipitate or a $SO_4^{2-}$ ion being liberated in the raw material aqueous solution in the case of using a sulfate of Ni, a sulfate of Mn, and a sulfate of M as raw materials. When the amount thereof is reduced by washing, the control of the amount of an inert fusing agent (described below) becomes easy and that is preferable.

In order to efficiently wash the co-precipitate, water is preferably used as a washing liquid. A water-soluble organic solvent such as an alcohol or acetone may be added to the washing liquid as necessary. The washing may be carried out twice or more, and, for example, it may be possible to wash the co-precipitate using water, and then wash again the co-precipitate using the above-described water-soluble organic solvent.

The drying of the washed co-precipitate can be carried out by a thermal treatment, and may also be carried out by blow drying, vacuum drying, etc., or a combination thereof. When the co-precipitate is dried by a thermal treatment, the heating temperature is preferably in a range of 50° C. to 300° C., and more preferably in a range of approximately 100° C. to 200° C.

A co-precipitate obtained by washing and drying the co-precipitate preferably has a BET specific surface area in a range of approximately 10 $m^2/g$ to 130 $m^2/g$. The BET specific surface area of the co-precipitate can be controlled using the drying temperature. When the drying temperature is set to be lower, a co-precipitate having a smaller BET specific surface area is obtained, and, when the drying temperature is set to be higher, a co-precipitate having a larger BET specific surface area is obtained.

In order to accelerate the reactivity during heating described below, the BET specific surface area of the co-precipitate is preferably 20 m$^2$/g or more, and more preferably 30 m$^2$/g or more. In addition, since the co-precipitate is easy to handle, the BET specific surface area of the co-precipitate is preferably 100 m$^2$/g or less, and more preferably 90 m$^2$/g or less. The upper limit value and lower limit value of the BET specific surface area may be adequately combined together.

The co-precipitate obtained in the step (2) is preferably constituted a mixture of primary particles having an average particle diameter (average primary particle diameter) of from 0.001 μm to 0.1 μm and secondary particles formed by the agglomeration of the primary particles having an average secondary particle diameter (average secondary particle diameter) of from 1 μm to 100 μm. The method for measuring the average primary particle diameter is as described above. The average secondary particle diameter can also be obtained in accordance with the method for measuring the average primary particle diameter. The average secondary particle diameter of the secondary particles is preferably from 1 μm to 50 and more preferably from 1 μm to 30 μm.

(Step (3))

In the step (3), the co-precipitate obtained in the step (2) and a lithium compound are mixed together to produce a mixture, and the obtained mixture is heated.

Examples of the lithium compound include one or more salts selected from the group consisting of lithium hydroxide, lithium chloride, lithium nitrate, and lithium carbonate. The lithium compound being used may be an anhydride or a hydrate. An anhydride and a hydrate may be jointly used.

In order to obtain a non-aqueous electrolyte secondary battery having a higher discharge capacity, in the mixture obtained by mixing the co-precipitate obtained in the step (2) and a lithium compound, the amount (mole) of Li with respect to the total amount (mole) of Ni, Mn, and M (M represents one or more elements selected from the group consisting of Co, Fe, Mg, Al, and Ca) (Li/(Ni+Mn+M)) is preferably from 1.1 to 1.6, and more preferably from of 1.3 to 1.5.

The mixing may be carried out by any of dry mixing and wet mixing, and dry mixing is preferable since the operation is simple. Examples of the mixing apparatus include agitation mixer, a V-shaped mixer, a W-shaped mixer, a ribbon mixer, a drum mixer, a ball mill, etc.

The heating temperature during the heating in the step (3) is an important factor to control the BET specific surface area of the lithium composite metal oxide. The BET specific surface area of the obtained lithium composite metal oxide tends to decrease with the increase of the heating temperature during the heating.

For example, when the compositional ratio (molar ratio) between Ni and Mn in the co-precipitate obtained in the step (2) is 1:1, in the step (3), the BET specific surface area of the lithium composite metal oxide obtained with calcining at a heating temperature of 1000° C. is as small as 0.3 m$^2$/g, and the discharge capacity maintenance rate at a high current rate does not result in sufficient. As the heating temperature decreases to lower than the above-described heating temperature, the BET specific surface area tends to increase. In order to obtain the BET specific surface area of the lithium composite metal oxide of from 6 m$^2$/g to 30 m$^2$/g, the heating temperature is preferably from 650° C. to 950° C.

The heating temperature may be maintained at a fixed temperature during heating, and, when the heating temperature is within the above-described heating temperature range, the temperature condition may be changed during the heating.

The time for keeping the above-described heating temperature is preferably from 0.1 hours to 20 hours, and more preferably from 0.5 hours to 8 hours.

The rate of temperature increase up to the above-described heating temperature is preferably from 50° C./hour to 400° C./hour. In addition, the rate of temperature decrease from the above-described heating temperature to room temperature is preferably from 10° C./hour to 400° C./hour.

As the atmosphere for the heating in the step (3), it is possible to use an air, oxygen, nitrogen, argon, or a gas mixture thereof, and an air is preferable.

The lithium composite metal oxide of the present embodiment can be produced by the above-described steps (1) to (3).

The production method of the present embodiment has been described to include the steps from (1) to (3), but is not limited thereto. For example, it is possible to produce the lithium composite metal oxide of the present embodiment by preparing a mixture obtained by mixing a salt including a Ni ion, a Mn ion, and an M ion and the lithium compound using a other method replacing a part of the steps (1), (2), and (3), and heating the obtained mixture under the conditions of the step (3).

The above-described "salt including a Ni ion, a Mn ion, and an M ion" may be a mixture of a salt including a Ni ion, a salt including a Mn ion, and a salt including an M ion. Examples of the above-described "a other method replacing a part of the steps (1), (2), and (3)" include a method for mixing the above-described salt in a solid phase, a method in which the above-described salt is dispersed in a liquid phase to produce a slurry and the obtained slurry is sprayed, dried, and mixed, etc.

(Inert Fusing Agent)

At the time of the heating in the step (3), the mixture may include an inert fusing agent such as ammonium fluoride or boric acid. The inert fusing agent is also called a flux or a fusing agent, and is a salt that does not react with a composite metal oxide which is a target substance, and is easily separated from the target substance. The inert fusing agent is fused at the heating temperature in the step (3), forms a reaction field, and accelerates a uniform reaction. Therefore, when the inert fusing agent is used, a product having a homogeneous composition is easily obtained.

More specific examples of the inert fusing agent include sulfates such as $K_2SO_4$ and $Na_2SO_4$; carbonates such as $K_2CO_3$ and $Na_2CO_3$; chlorides such as NaCl, KCl, and $NH_4Cl$; fluorides such as LiF, NaF, KF, and $HN_4F$; and boric acid. Among the above-described inert fusing agents, sulfates are preferable, and $K_2SO_4$ is more preferable. Two or more inert fusing agents may also be jointly used.

When the mixture includes the inert fusing agent, the reactivity of the mixture during the heating improves, and therefore the BET specific surface area of the obtained lithium composite metal oxide can be controlled. In the case of the heating temperatures being the same, as the content of the inert fusing agent in the mixture increases, the BET specific surface area of the oxide tends to increase. In addition, during the heating, when the inert fusing agent is included, a uniform reaction can be carried out, and therefore the local structure of the lithium composite metal oxide can be controlled at an atomic level by controlling the heating atmosphere.

The inert fusing agent can be added and mixed in when the co-precipitate and the lithium compound are mixed together in the step (3). In addition, the inert fusing agent may remain in the lithium composite metal oxide, or may be removed by washing.

The inert fusing agent may be mixed with the obtained co-precipitate by adding a solution of the inert fusing agent to the co-precipitate obtained by the separation operation in the step (2), and drying the mixture.

For example, in the step (1), when a sulfate of Ni, a sulfate of Mn, or a sulfate of M is used as a raw material, a $SO_4^{2-}$ ion is liberated in the raw material aqueous solution. The $SO_4^{2-}$ ion and a metal ion included in the alkali used for the co-precipitation (for example, in the case of using KOH as the alkali, a metal ion is a K ion) occasionally remain in the co-precipitate separated in the step (2), and the inert fusing agent ($K_2SO_4$ in the above-described example) is generated. Therefore, the inert fusing agent may be mixed with the obtained co-precipitate by using the raw material aqueous solution after the co-precipitation in the step (1) as the above-described "solution of the inert fusing agent", and drying the co-precipitate obtained in the step (2) to which the raw material aqueous solution after the co-precipitation has been added.

The inert fusing agent may be added and mixed in when the co-precipitate and the lithium compound are mixed with each other in the step (3). Since the amount of the inert fusing agent is easily controlled, the method in which the inert fusing agent is added in the step (3) is more preferable than the above-described method in which the inert fusing agent is added in the step (2). In the case of adding the inert fusing agent in the step (3), the amount of the inert fusing agent becomes easily controlled by means of washing the co-precipitate obtained in the step (2), and reducing the amount of the alkali remaining in the co-precipitate or a negative ion derived from a salt of Ni, a salt of Mn, or a salt of Co.

The inert fusing agent may remain in the lithium composite metal oxide, or may be removed by washing.

The content of the inert fusing agent in the mixture during the heating may be appropriately determined, and, as the content of the inert fusing agent increases, the average particle diameter tends to decrease. In order to make the particle diameters of the lithium composite metal oxide more uniform, the content of the inert fusing agent is preferably 0.1 parts by mass or more, and more preferably 1 part by mass or more with respect to 100 parts by mass of the lithium compound in the mixture. To increase the reaction activity between the lithium compound and the co-precipitate, the content of the inert fusing agent is preferably 400 parts by mass or less, and more preferably 100 parts by mass or less with respect to 100 parts by mass of the lithium compound in the mixture. The above-described upper limit value and lower limit value may be adequately selected.

The lithium composite metal oxide obtained after the heating may be ground using a ball mill, a jet mill, etc. The BET specific surface area and average particle diameter of the lithium composite metal oxide can be occasionally controlled by grinding. In addition, heating may be carried out after the grinding by means of grinding the lithium composite metal oxide obtained by carrying out the steps (1) to (3) followed by carrying out the step (3) again. Furthermore, the grinding and the heating in the step (3) may be repeated two or more times as necessary. In addition, the lithium composite metal oxide may also be washed and classified as necessary.

The above-described method is a method for producing the lithium composite metal oxide including M. In the above-described method, when M is not used, the lithium composite metal oxide including no M is obtained.

The lithium composite metal oxide of the present embodiment obtained in the above-described manner becomes a mixture of, typically, primary particles and secondary particles formed by the agglomeration of the primary particles.

When the lithium composite metal oxide is used as a positive electrode active material for a non-aqueous electrolyte secondary battery, a non-aqueous electrolyte secondary battery exhibiting a high discharge capacity and a high initial coulomb efficiency is obtained.

(Positive Electrode Active Material)

The lithium composite metal oxide of the present embodiment is useful as a positive electrode active material for a non-aqueous electrolyte secondary battery exhibiting a high discharge capacity and a high initial coulomb efficiency. The positive electrode active material of the present embodiment includes the above-described lithium composite metal oxide of the present embodiment.

In the positive electrode active material of the present embodiment, as long as the effects of the present invention are not significantly deteriorated, a compound different from the lithium composite metal oxide may be attached to the surfaces of particles constituting the lithium composite metal oxide.

An example of the compound is a compound containing one or more elements selected from the group consisting of B, Al, Ga, In, Si, Ge, Sn, Mg, and transition metal elements, preferably a compound containing one or more elements selected from the group consisting of B, Al, Mg, Ga, In, and Sn, and more preferably a compound of Al. Examples thereof include oxides, hydroxides, oxyhydroxides, carbonates, nitrates, and organic acid salts of the above-described elements, and preferable examples thereof include oxides, hydroxides, and oxyhydroxides. In addition, the compound may be used in a mixture. Among the above-described compounds, alumina is a particularly preferable compound.

After the compound is attached to the surfaces of the particles constituting the lithium composite metal oxide, heating may be carried out.

Since the above-described lithium composite metal oxide of the present embodiment is used as the above-described positive electrode active material, a non-aqueous electrolyte secondary battery using the positive electrode active material is capable of exhibiting a higher discharge capacity and a higher initial coulomb efficiency than ever.

[Non-Aqueous Electrolyte Secondary Battery]

Next, a positive electrode using the positive electrode active material of the present embodiment, and a non-aqueous electrolyte secondary battery including the positive electrode will be described with describing the constitution of the non-aqueous electrolyte secondary battery.

An example of the non-aqueous electrolyte secondary battery of the present embodiment includes a positive electrode, a negative electrode, a separator disposed between the positive electrode and the negative electrode, and an electrolytic solution.

FIG. 1 is a schematic view illustrating an example of the non-aqueous electrolyte secondary battery of the present embodiment. A cylindrical non-aqueous electrolyte secondary battery 10 of the present embodiment is formed as described below.

First, as illustrated in FIG. 1(a), two separators 1 having a band shape, a band-shaped positive electrode 2 having a positive electrode lead 21 at one end, and a band-shaped negative electrode 3 having a negative electrode lead 31 at one end are laminated in an order of the separator 1, the positive electrode 2, the separator 1, and the negative electrode 3, and are coiled, resulting in forming an electrode group 4.

Next, as illustrated in FIG. 1(*b*), the electrode group 4 and an insulator, which is not illustrated, are stored in a battery can 5, then, the bottom of the can is sealed, an electrolyte solution 6 is impregnated into the electrode group 4, and an electrolyte is disposed between the positive electrode 2 and the negative electrode 3. Furthermore, the top section of the battery can 5 is sealed using a top insulator 7 and a sealing body 8, whereby the non-aqueous electrolyte secondary battery 10 can be formed.

The shape of the electrode group 4 can be, for example, a columnar shape of which the cross-sectional shape becomes round, oval, a rectangular shape, or a rectangular shape with rounded edges when the electrode group 4 is cut in a direction perpendicular to the coiling axis.

As the shape of the non-aqueous electrolyte secondary battery including the above-described electrode group 4, it is possible to employ the shapes determined by IEC60086, which is the standard of batteries determined by the International Electrotechnical Commission (IEC), or JIS C 8500. Examples thereof include a cylindrical shape, an angular shape, etc.

The non-aqueous electrolyte secondary battery is not limited to the above-described coiled constitution, and may have a laminated constitution obtained by laminating a positive electrode, a separator, a negative electrode, and a separator repeatedly. Examples of the laminated non-aqueous electrolyte secondary battery include a so-called coin-type battery, a button-type battery, and a paper-type (or sheet-type) battery.

Hereinafter, the respective constitutions will be sequentially described.

(Positive Electrode)

The positive electrode of the present embodiment can be manufactured by, first, preparing a positive electrode mixture including the above-described positive electrode active material of the present embodiment, a conductive material, and a binder, and supporting the positive electrode mixture by a positive electrode current collector.

(Conductive Material)

As the conductive material included in the positive electrode of the present embodiment, a carbon material can be used. Examples of the carbon material include graphite powder, carbon black (for example, acetylene black), fibrous carbon materials, etc. Since the carbon black is a micro particle and has a great surface area, the conductivity in the positive electrode can be increased, and the charge and discharge efficiency and the output characteristics can be improved by adding a small amount of the carbon black to the positive electrode mixture; however, when the carbon black is excessively added, both the binding strength between the positive electrode mixture and the positive electrode current collector by the binder and the binding strength inside the positive electrode mixture decrease, and conversely, the internal resistance is increased.

The proportion of the conductive material in the positive electrode mixture is preferably from 5 parts by mass to 20 parts by mass with respect to 100 parts by mass of the positive electrode active material. In the case of using a fibrous carbon material such as a graphitized carbon fiber or a carbon nanotube as the conductive material, it is also possible to decrease the proportion.

(Binder)

As the binder included in the positive electrode of the present embodiment, a thermoplastic resin can be used.

Examples of the thermoplastic resin include fluorine resins such as polyvinylidene fluoride (hereinafter, in some cases, referred to as PVdF), polytetrafluoroethylene (hereinafter, in some cases, referred to as PTFE), ethylene tetrafluoride.propylene hexafluoride.vinylidene fluoride-based copolymers, propylene hexafluoride.vinylidene fluoride-based copolymers, and ethylene tetrafluoride.perfluorovinyl ether-based copolymers; polyolefin resins such as polyethylene and polypropylene.

Two or more thermoplastic resins may be used in a mixture thereof. When a fluorine resin and a polyolefin resin are used as the binder, by means of adjusting the proportion of the fluorine resin of from 1 mass % to 10 mass %, and the proportion of the polyolefin resin of from 0.1 mass % to 2 mass % in the entire positive electrode mixture, it is possible to obtain a positive electrode mixture having a strong adhesive force to the positive electrode current collector.

(Positive Electrode Current Collector)

As the positive electrode current collector included in the positive electrode of the present embodiment, it is possible to use a band-shaped member constituted of a metal material such as Al, Ni, or stainless steel as a constitutional material. Among the above-described members, in the view point that Al is easy to process and is inexpensive, a member for which Al is used as a forming material and which is formed into a thin film shape is preferable.

Examples of a method for supporting the positive electrode mixture by the positive electrode current collector include a method in which the positive electrode mixture is molded on the positive electrode current collector by pressure. The positive electrode mixture can be supported by the positive electrode current collector by producing paste from the positive electrode mixture using an organic solvent, applying the obtained paste of the positive electrode mixture to at least one surface of the positive electrode current collector, drying the paste, and affixing the paste through pressing.

In the case of producing the paste from the positive electrode mixture, examples of the organic solvent that can be used include amine-based solvents such as N,N-dimethylaminopropyleamine and diethylene triamine; ether-based solvents such as tetrahydrofuran; ketone-based solvents such as methyl ethyl ketone; ester-based solvents such as methyl acetate; and amide-based solvents such as dimethyl acetamide, N-methyl-2-pyrrolidone (hereinafter, in some cases, referred to as NMP).

Examples of the method for applying the paste of the positive electrode mixture to the positive electrode current collector include a slit die coating method, a screen coating method, a curtain coating method, a knife coating method, a gravure coating method, and an electrostatic spray method.

The positive electrode can be formed using the above-described method.

(Negative Electrode)

The negative electrode included in the non-aqueous electrolyte secondary battery of the present embodiment needs to capable of doping and de-doping a lithium ion at a potential lower than that in the positive electrode, and examples thereof include an electrode produced by supporting a negative electrode mixture including a negative electrode active material on a negative electrode current collector, and an electrode constituted of a negative electrode active material only.

(Negative Electrode Active Material)

Examples of the negative electrode active material included in the negative electrode include materials which are carbon materials, chalcogen compounds (oxides, sulfides, etc.), nitrides, metals, or alloys, and allow a lithium ion to be doped or de-doped at a potential lower than in the positive electrode.

Examples of the carbon materials that can be used as the negative electrode active material include graphite such as natural graphite and artificial graphite, cokes, carbon black, pyrolytic carbons, carbon fibers, and organic macromolecular compound-sintered bodies.

Examples of oxides that can be used as the negative electrode active material include oxides of silicon expressed by Formula $SiO_x$ (here, x represents a positive real number) such as $SiO_2$ and SiO; oxides of titanium expressed by Formula $TiO_x$ (here, x represents a positive real number) such as $TiO_2$ and TiO; oxides of vanadium expressed by Formula $VO_x$ (here, x represents a positive real number) such as $V_2O_5$ and $VO_2$; oxides of iron expressed by Formula $FeO_x$ (here, x represents a positive real number) such as $Fe_3O_4$, $Fe_2O_3$, and FeO; oxides of tin expressed by Formula $SnO_x$ (here, x represents a positive real number) such as $SnO_2$ and SnO; oxides of tungsten expressed by General Formula $WO_x$ (here, x represents a positive real number) such as $WO_3$ and $WO_2$; and composite metal oxides containing lithium and titanium or vanadium such as $Li_4Ti_5O_{12}$ and $LiVO_2$.

Examples of sulfides that can be used as the negative electrode active material include sulfides of titanium expressed by Formula $TiS_x$ (here, x represents a positive real number) such as $Ti_2S_3$, $TiS_2$, and TiS; sulfides of vanadium expressed by Formula $VS_x$ (here, x represents a positive real number) such as $V_3S_4$, $VS_2$, and VS; sulfides of iron expressed by Formula $FeS_x$ (here, x represents a positive real number) such as $Fe_3S_4$, $FeS_2$, and FeS; sulfides of molybdenum expressed by Formula $MoS_x$ (here, x represents a positive real number) such as $Mo_2S_3$, and $MoS_2$; sulfides of tin expressed by Formula $SnS_x$ (here, x represents a positive real number) such as $SnS_2$ and SnS; sulfides of tungsten expressed by Formula $WS_x$ (here, x represents a positive real number) such as $WS_2$; sulfides of antimony expressed by Formula $SbS_x$ (here, x represents a positive real number) such as $Sb_2S_3$; and sulfides of selenium expressed by Formula $SeS_x$ (here, x represents a positive real number) such as $Se_5S_3$, $SeS_2$, and SeS.

Examples of nitrides that can be used as the negative electrode active material include lithium-containing nitrides such as $Li_3N$ and $Li_{3-x}A_xN$ (here, A is either or both Ni and Co, and 0<x<3).

The carbon materials, the oxides, the sulfides, and nitrides may be singly used, or two or more thereof may be jointly used. In addition, the carbon materials, the oxides, the sulfides, and nitrides may be crystalline or amorphous. The carbon materials, the oxides, the sulfides, and nitrides are used as an electrode by being supported mainly on a negative electrode current collector.

Examples of metals that can be used as the negative electrode active material include lithium metals, silicon metals, tin metals, etc.

Examples of alloys that can be used as the negative electrode active material include lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$.

The metals or alloys are processed into, for example, a foil shape, and then are mainly used singly as an electrode.

Among the above-described negative electrode materials, since the potential of the negative electrode rarely changes during charging from an uncharged state to a fully charged state (the potential flatness is favorable), the average discharge potential is lower, and when the battery is repeatedly charged and discharged, the capacity maintenance rate is higher (the cycle characteristics are favorable), carbon materials including graphite such as natural graphite or artificial graphite as a main component are preferably used. Examples of the shape of the carbon material include a flake shape such as natural graphite, a spherical shape such as mesocarbon microbeads, a fibrous shape such as a graphitized carbon fiber, an agglomerate of fine powder, etc., and the carbon material may have any shape.

The negative electrode mixture may include a binder as necessary. As the binder, a thermoplastic resin can be used, and examples thereof include PVdF, thermoplastic polyimides, carboxymethyl cellulose, polyethylene, and polypropylene.

(Negative Electrode Current Collector)

Examples of the negative electrode current collector included in the negative electrode include a band-shaped member constituted of a metal material such as Cu, Ni, or stainless steel as a constitutional material. Among the above-described members, a member for which Cu is used as a forming material and which is processed into a thin film shape is preferable since Cu does not easily form an alloy with lithium, and is easily processed.

Examples of the method for supporting the negative electrode mixture on the above-described negative electrode current collector include, similarly to the case of the positive electrode, a method in which the negative electrode mixture is supported on the negative electrode current collector through pressurization-molding, and a method in which paste is produced using a solvent etc., is applied to and dried on the negative electrode current collector, and is affixed through pressing.

(Separator)

As the separator included in the non-aqueous electrolyte secondary battery of the present embodiment, it is possible to use, for example, a material which is made of a polyolefin resin such as polyethylene or polypropylene, a fluorine resin, a nitrogen-containing aromatic polymer, etc., and has a form of a porous film, a non-woven fabric, a woven fabric, etc. In addition, the separator may be formed using two or more materials, or may be formed by laminating these materials.

The thickness of the separator is preferably thin as long as the mechanical strength is maintained since the volume energy density of the battery increases, and the internal resistance decreases, and is preferably approximately from 5 μm to 200 μm, and more preferably approximately from 5 μm to 40 μm.

The separator preferably includes a porous film containing a thermoplastic resin. The non-aqueous electrolyte secondary battery preferably has a function of, when an abnormal current flows in a battery due to the short circuit etc. between the positive electrode and the negative electrode, shielding the current at the short circuit position to inhibit (shut down) the flow of an excessive current. The shut-down is performed by softening or melting the porous film in the separator to shield micro pores, when the separator at the short circuit position is overheated due to short circuit, and exceeds the previously-estimated operational temperature. In addition, even when the temperature inside the battery increases up to a certain high temperature after the shut-down, the separator preferably maintains the shut-down state without being broken due to the temperature.

When a porous film is used as the separator, the thermoplastic resin used for the porous film needs to be not dissolved in the electrolytic solution in the non-aqueous electrolyte secondary battery. Examples thereof include polyolefin resins such as polyethylene or polypropylene, and thermoplastic polyurethane resins, and a mixture of two or more thermoplastic resins may be used.

In the case of using a porous film as the separator, in order to make the separator be softened and be shut down at a lower temperature, the porous film preferably contains polyethylene. Examples of the polyethylene include polyethylene such as low-density polyethylene, high-density polyethylene, and linear polyethylene, and also include ultrahigh-molecular-weight polyethylene having a molecular weight of a million or more.

To further increase the piercing strength of the porous film used as the separator, the thermoplastic resin constituting the porous film preferably contains at least ultrahigh-molecular-weight polyethylene. In addition, there is also a case in which, on the manufacturing surface of the porous film, the thermoplastic resin preferably contains a wax made of polyolefin having a low molecular weight (a weight-average molecular weight of 10000 or less).

In the present embodiment, since the separator favorably transmits an electrolyte while the battery is in use (is charged and discharged), the air permeability resistance by the Gurley method determined by JIS P 8117 is preferably from 50 seconds/100 cc to 300 seconds/100 cc, and more preferably from 50 seconds/100 cc to 200 seconds/100 cc.

In addition, the porosity of the separator is preferably from 30 vol % to 80 vol %, and more preferably from 40 vol % to 70 vol %. Separators having different porosities may be laminated.

(Electrolyte Solution)

The electrolyte solution included in the non-aqueous electrolyte secondary battery of the present embodiment includes an electrolyte and an organic solvent.

Examples of the electrolyte included in the electrolyte solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN SO_2C_2F_5)_2$, $LiN\ SO_2CF_3)(COCF_3)$, $Li(C_4F_9SO_3)$, $LiC(SO_2CF_3)_3$, $Li_2B_{10}Cl_{10}$, LiBOB (here, BOB represents bis (oxalato)borate), lower aliphatic carboxylic acid lithium salt, and $LiAlCl_4$. The above-described electrolytes may be singly used, or two or more electrolytes may be used in a mixture form. Among the above-described electrolytes, it is preferable to use an electrolyte including at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$ which contain fluorine as the electrolyte.

In addition, as the organic solvent included in the electrolyte, it is possible to use, for example, a carbonate such as propylene carbonate, ethylene carbonate, dimethyl carbonate, diethyl carbonate, ethyl methyl carbonate, 4-trifluoromethyl-1,3-dioxolane-2-one, and 1,2-di(methoxycarbonyloxy)ethane; an ether such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyl tetrahydrofuran; an ester such as methyl formate, methyl acetate, and y-butyrolactone; a nitrile such as acetonitrile and butyronitrile; an amide such as N,N-dimethyl formamide and N,N-dimethylacetoamide; a carbamate such as 3-methyl-2-oxazolidone; a sulfur-containing compound such as sulfolane, dimethyl sulfoxide, and 1,3-propane sultone; or a solvent produced by further introducing a fluoro group into the above-described organic solvent (a solvent in which one or more hydrogen atoms included in the organic solvent is substituted by a fluorine atom).

As the organic solvent, it is preferable to use two or more organic solvents in a mixture form. Among the above-described organic solvents, a solvent mixture including a carbonate is preferable, and a solvent mixture of a cyclic carbonate and a non-cyclic carbonate and a solvent mixture of a cyclic carbonate and ether are more preferable. As the solvent mixture of a cyclic carbonate and a non-cyclic carbonate, a solvent mixture including ethylene carbonate, dimethyl carbonate, and ethyl methyl carbonate is preferable. An electrolyte solution using the above-described solvent mixture has advantages of a wider operational temperature range, is more hardly deteriorated when used at a high voltage, is more hardly deteriorated when used for a long period of time, and has advantages of being hardly decomposed in the case of using a graphite material such as natural graphite or artificial graphite as the active material for the negative electrode.

In addition, in order to improve the stability of the obtained non-aqueous electrolyte secondary battery, it is preferable to use an electrolyte solution including a lithium salt containing fluorine such as $LiPF_6$ and an organic solvent having a fluorine substituent as the electrolyte solution. A solvent mixture including ether having a fluorine substituent such as pentafluoropropylene methyl ether or 2,2,3,3-tetrafluoropropyl difluoromethyl ether and dimethyl carbonate is more preferable since the capacity maintenance rate is higher even when the battery is discharged at a high voltage.

A solid electrolyte may be used instead of the above-described electrolytic solution. As the solid electrolyte, it is possible to use, for example, an organic macromolecular electrolyte such as a polyethylene oxide-based macromolecular compound or a macromolecular compound including at least one polyorganosiloxane chain or polyoxyalkylene chain. In addition, it is also possible to use a so-called gel-type electrolyte including a non-aqueous electrolytic solution held in a macromolecular compound. In addition, it is also possible to use an inorganic solid electrolyte including a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, or $Li_2S$—$SiS_2$—$Li_2SO_4$. The use of the solid electrolyte is occasionally capable of improving the stability of the non-aqueous electrolyte secondary battery.

In the non-aqueous electrolyte secondary battery of the present embodiment, when the solid electrolyte is used, the solid electrolyte plays a role of the separator, and, in such a case, the separator may not be required.

Among non-aqueous electrolyte secondary batteries for which the positive electrode active material including the lithium composite metal oxide of the present embodiment is used, there is a non-aqueous electrolyte secondary battery in which the charge potential of the positive electrode at a fully charged state reaches 4.35 V (vs. Li/Li$^+$) or more. This non-aqueous electrolyte secondary battery exhibits a high discharge capacity, and this is preferable. Here, the "charge potential of the positive electrode at a fully charged state being 4.35 V (vs. Li/Li$^+$) or more" means that the charge potential of the positive electrode is 4.35 V or more when a non-aqueous electrolyte secondary battery (test battery) produced using the positive electrode and metal lithium as a negative electrode is fully charged.

Since the above-described positive electrode includes the positive electrode active material for which the above-described lithium composite metal oxide of the present embodiment is used, the non-aqueous electrolyte secondary battery is capable of exhibiting a higher discharge capacity and a higher initial coulomb efficiency than ever. Since the above-described non-aqueous electrolyte secondary battery includes the above-described positive electrode, the non-aqueous electrolyte secondary battery exhibits a higher discharge capacity and a higher initial coulomb efficiency than before.

EXAMPLES

Next, the present invention will be described in more detail using examples.

In the present example, the evaluation of lithium composite metal oxides (positive electrode active materials) and the production and evaluation of positive electrodes and lithium secondary batteries were carried out as described below.

(1) Evaluation of the Lithium Composite Metal Oxide

1. Analysis of the Composition of the Lithium Composite Metal Oxide

The composition of the lithium composite metal oxide was analyzed using an inductively-coupled plasma emission analyzer (SPS3000 manufactured by STI Nano Technology) after the powder of the obtained lithium composite metal oxide was dissolved in hydrochloric acid.

2. Measurement of the BET Specific Surface Area of the Lithium Composite Metal Oxide The BET specific surface area of the lithium composite metal oxide was measured using a FLOWSORB II2300 manufactured by Micromeritics Instrument Corporation after 1 g of lithium composite metal oxide powder was dried at 150° C. in a nitrogen atmosphere for 15 minutes.

3. Measurement of the Average Particle Diameter of the Lithium Composite Metal Oxide 0.1 g of lithium composite metal oxide powder to be measured was put into 50 ml of a 0.2 mass % sodium hexametaphosphate aqueous solution, and a dispersion liquid in which the powder was dispersed was obtained. The particle size distribution of the obtained dispersion liquid was measured using a MASTERSIZER 2000 (a laser diffraction scattering particle size distribution measuring instrument) manufactured by Malvern Instruments Ltd., and a volume-based cumulative particle size distribution curve was obtained. In the obtained cumulative particle size distribution curve, the value of the particle diameter ($D_{50}$) from the micro particle side at the time of 50% accumulation was used as the average particle diameter of the lithium composite metal oxide.

4. Measurement of the Average Primary Particle Diameter of the Lithium Composite Metal Oxide The lithium composite metal oxide powder were placed on a conductive sheet attached onto a sample stage, and SEM observation was carried out by radiating an electron beam with an accelerated voltage of 20 kV using a JSM-5510 manufactured by JEOL Ltd. 50 primary particles were arbitrarily selected from an image (SEM photograph) obtained from the SEM observation, parallel lines were drawn from a certain direction so as to hold a projection image of each primary particle, and the distance (unidirectional particle diameter) between the parallel lines was measured as the particle diameter of the primary particle. The arithmetic average value of the obtained particle diameters of the primary particles was used as the average primary particle diameter of the lithium composite metal oxide.

5. Powder X-Ray Diffraction Measurement of the Lithium Composite Metal Oxide

The powder X-ray diffraction of the lithium composite metal oxide was measured using a powder X-ray diffraction apparatus (RINT2500TTR manufactured by Rigaku Corporation, horizontal specimen type). The obtained lithium composite metal oxide was loaded into a dedicated substrate, and the measurement was carried out in a range of diffraction angle $2\theta=10°$ to $90°$ using a Cu—K$\alpha$ radiation source, thereby obtaining a powder X-ray diffraction pattern.

In addition, the Rietveld analysis of the powder X-ray diffraction pattern was carried out using an analysis program RIETAN-2000 (refer to F. Izumi and T. Ikeda, Mater. Sci. Forum. 321-324 (2000) 198), and a space group of the crystal structure of the lithium composite metal oxide was obtained.

(2) Production of a Positive Electrode

A lithium composite metal oxide (positive electrode active material) obtained using a production method described below, a conductive material (including acetylene black and graphite at a mass ratio of 9:1), and a binder (PVdF) were added and kneaded so as to obtain a composition of the positive electrode active material, the conductive material, and the binder at a mass ratio of 87:10:3, thereby preparing a paste-form positive electrode mixture. During the preparation of the positive electrode mixture, N-methyl-2-pyrrolidone was used as an organic solvent.

The obtained positive electrode mixture was applied to a 40 μm-thick Al foil which served as a current collector, and was dried in a vacuum at 150° C. for eight hours, thereby obtaining a positive electrode.

(3) Production of a Non-Aqueous Electrolyte Secondary Battery (Coin Cell)

The following operations were carried out in a glove box in an argon atmosphere.

The positive electrode produced in the "(2) production of a positive electrode" was placed on a bottom lid of a coin cell for a coin-type battery R2032 (manufactured by Hohsen Corporation) with the aluminum foil surface facing downward, and a laminate film separator (a separator including a heat-resistant porous layer laminated on a polyethylene porous film (thickness: 16 μm)) was placed on the positive electrode. 300 μl of an electrolytic solution was injected thereinto. The electrolyte solution used was prepared by dissolving 1 mol/l of $LiPF_6$ in a liquid mixture of ethylene carbonate, dimethyl carbonate, and ethyl methyl carbonate at a volume ratio of 30:35:35.

Next, metal lithium used as a negative electrode was placed on the laminate film separator, was covered with a top lid through a gasket, and was swaged using a swage, thereby producing a non-aqueous electrolyte secondary battery (coin-type battery R2032, hereinafter, in some cases, referred to as "coin-type battery").

(4) Charge and Discharge Test

A charge and discharge test was carried out under conditions described below using the coin-type battery produced in the "(3) production of a non-aqueous electrolyte secondary battery (coin cell)". The charge capacity, the discharge capacity, and the initial coulomb efficiency in the charge and discharge test were obtained respectively as described below.

<Charge and Discharge Test>

Test temperature: 25° C.

Charging conditions: maximum charging voltage 4.6 V, charging time 20 hours, charging current 0.5 mA/cm$^2$ Discharging conditions: minimum discharging voltage 2.5 V, discharging time 20 hours, discharging current 0.5 mA/cm$^2$ Initial coulomb efficiency (%)=initial discharge capacity (mAh/g)/initial charge capacity (mAh/g)×100

Example 1

1. Production of a Precursor (Co-Precipitate) of a Lithium Composite Metal Oxide Nickel sulfate hexahydrate and manganese sulfate hydrate were weighed respectively so that the molar ratio of Ni:Mn reached 0.25:0.75, and were dissolved in pure water, thereby obtaining a transition metal aqueous solution containing Ni, Mn, and SO$_4$.

Co-precipitation was carried out by adding a potassium hydroxide aqueous solution to the transition metal aqueous solution, and a precipitate was generated, thereby obtaining a slurry. Solid-liquid separation was carried out on the obtained slurry, the slurry was washed using distilled water, and was dried at 150° C., thereby obtaining a co-precipitate F$^1$.

2. Production and Evaluation of a Lithium Composite Metal Oxide

The obtained co-precipitate F$^1$, lithium carbonate was weighed so that the amount (mole) of Li reached 1.5 times the total amount (mole) of Ni and Mn contained in the obtained co-precipitate F$^1$, and potassium sulfate as an inert fusing agent were mixed using a mortar, thereby obtaining a mixture.

Next, the obtained mixture was put into an alumina calcining container, and the alumina calcining container was put into an electric furnace. The alumina calcining container was held at 850° C. in the atmosphere for six hours, heated, and cooled to room temperature, thereby obtaining a calcined material.

The obtained calcined product was ground, and was dispersed in distilled water. After supernatants generated after the calcined product was left to stand were removed by decantation, the calcined product was filtered, and was dried at 300° C. for six hours, thereby obtaining a powder-form lithium composite metal oxide E$^1$.

As a result of analyzing the composition of the obtained E$^1$, the molar ratio of Li:Ni:Mn contained in E$^1$ was 1.30:0.27:0.73.

In addition, the BET specific surface area of E$^1$ was 26.1 m$^2$/g.

In addition, the average particle diameter of E$^1$ was 2.3 μm, and the average primary particle diameter was 0.15 μm.

When a powder X-ray diffraction measurement of E$^1$ was carried out, a diffraction peak was present at 2θ=20.8°. In addition, the crystal structure of E$^1$ belonged to a space group of C2/m.

3. The Charge and Discharge Test of a Non-Aqueous Electrolyte Secondary Battery

A coin-type battery was produced using E$^1$, and a charge and discharge test was carried out. The charge capacity (mAh/g) was 283, the discharge capacity (mAh/g) was 233, and the initial coulomb efficiency (%) was 82.3.

Example 2

1. Production of a Precursor (Co-Precipitate) of a Lithium Composite Metal Oxide The same operation as in Example 1 except for the fact that nickel sulfate hexahydrate and manganese sulfate hydrate were weighed respectively so that the molar ratio of Ni:Mn reached 0.40:0.60 was carried out, thereby obtaining a co-precipitate F$^2$.

2. Production and Evaluation of a Lithium Composite Metal Oxide

The same operation as in Example 1 except that lithium carbonate was weighed so that the amount (mole) of Li reached 1.3 times the total amount (mole) of Ni and Mn contained in the obtained co-precipitate F$^2$ was carried out, thereby obtaining a lithium composite metal oxide E$^2$.

As a result of analyzing the composition of the obtained E$^2$, the molar ratio of Li:Ni:Mn contained in E$^2$ was 1.14:0.42:0.58.

In addition, the BET specific surface area of E$^2$ was 15.7 m$^2$/g.

In addition, the average particle diameter of E$^2$ was 1.7 μm and the average primary particle diameter was 0.18 μm.

When a powder X-ray diffraction measurement of E$^2$ was carried out, a diffraction peak was present at 2θ=20.8°. In addition, the crystal structure of E$^2$ belonged to a space group of R3-m.

3. The Charge and Discharge Test of a Non-Aqueous Electrolyte Secondary Battery

A coin-type battery was produced using E$^2$, and a charge and discharge test was carried out. The charge capacity (mAh/g) was 272, the discharge capacity (mAh/g) was 235, and the initial coulomb efficiency (%) was 86.4.

Example 3

1. Production of a Precursor (Co-Precipitate) of a Lithium Composite Metal Oxide Nickel sulfate hexahydrate, manganese sulfate hydrate, and cobalt sulfate heptahydrate were weighed respectively so that the molar ratio of Ni:Mn:Co reached 0.23:0.68:0.09, and were dissolved in pure water, thereby obtaining a transition metal aqueous solution containing Ni, Mn, Co, and SO$_4$.

Co-precipitation was carried out by adding a potassium hydroxide aqueous solution to the transition metal aqueous solution, and a precipitate was generated, thereby obtaining a slurry. Solid-liquid separation was carried out on the obtained slurry, the slurry was washed using distilled water, and was dried at 150° C., thereby obtaining a co-precipitate F$^3$.

2. Production and Evaluation of a Lithium Composite Metal Oxide

The same operation as in Example 1 except that lithium carbonate was weighed so that the amount (mole) of Li reached 1.5 times the total amount (mole) of Ni, Mn, and Co contained in the obtained co-precipitate F$^3$ was carried out, thereby obtaining a lithium composite metal oxide E$^3$.

As a result of analyzing the composition of the obtained E$^3$, the molar ratio of Li:Ni:Mn:Co contained in E$^3$ was 1.29:0.24:0.68:0.08.

In addition, the BET specific surface area of E$^3$ was 21.2 m$^2$/g.

In addition, the average particle diameter of E$^3$ was 3.3 μm, and the average primary particle diameter was 0.13 μm.

When a powder X-ray diffraction measurement of E$^3$ was carried out, a diffraction peak was present at 2θ=20.8°. In addition, the crystal structure of E$^3$ belonged to a space group of C2/m.

3. The Charge and Discharge Test of a Non-Aqueous Electrolyte Secondary Battery

A coin-type battery was produced using E$^3$, and a charge and discharge test was carried out. The charge capacity (mAh/g) was 332, the discharge capacity (mAh/g) was 288, and the initial coulomb efficiency (%) was 86.7.

Example 4

1. Production of a Precursor (Co-Precipitate) of a Lithium Composite Metal Oxide The same operation as in Example 3 except that nickel sulfate hexahydrate, manganese sulfate hydrate, and cobalt sulfate heptahydrate were weighed respectively so that the molar ratio of Ni:Mn:Co reached 0.34:0.53:0.13 was carried out, thereby obtaining a co-precipitate $F^4$.

2. Production and Evaluation of a Lithium Composite Metal Oxide

The same operation as in Example 1 except that lithium carbonate was weighed so that the amount (mole) of Li reached 1.3 times the total amount (mole) of Ni, Mn, and Co contained in the obtained co-precipitate $F^4$ was carried out, thereby obtaining a lithium composite metal oxide $E^4$.

As a result of analyzing the composition of the obtained $E^4$, the molar ratio of Li:Ni:Mn:Co contained in $E^4$ was 1.19:0.34:0.53:0.13.

In addition, the BET specific surface area of $E^4$ was 13.4 m²/g.

In addition, the average particle diameter of $E^4$ was 2.8 µm, and the average primary particle diameter was 0.18 µm.

When a powder X-ray diffraction measurement of $E^4$ was carried out, a diffraction peak was present at $2\theta=20.8°$. In addition, the crystal structure of $E^4$ belonged to a space group of C2/m.

3. The Charge and Discharge Test of a Non-Aqueous Electrolyte Secondary Battery

A coin-type battery was produced using $E^4$, and a charge and discharge test was carried out. The charge capacity (mAh/g) was 266, the discharge capacity (mAh/g) was 230, and the initial coulomb efficiency (%) was 86.5.

Example 5

1. Production of a Precursor (Co-Precipitate) of a Lithium Composite Metal Oxide The same operation as in Example 3 except that nickel sulfate hexahydrate, manganese sulfate hydrate, and cobalt sulfate heptahydrate were weighed respectively so that the molar ratio of Ni:Mn:Co reached 0.20:0.65:0.15 was carried out, thereby obtaining a co-precipitate $F^5$.

2. Production and Evaluation of a Lithium Composite Metal Oxide

The same operation as in Example 1 except that lithium carbonate was weighed so that the amount (mole) of Li reached 1.5 times the total amount (mole) of Ni, Mn, and Co contained in the obtained co-precipitate $F^5$ was carried out, thereby obtaining a lithium composite metal oxide $E^5$.

As a result of analyzing the composition of the obtained $E^5$, the molar ratio of Li:Ni:Mn:Co contained in $E^4$ was 1.36:0.20:0.65:0.15.

In addition, the BET specific surface area of $E^5$ was 16.3 m²/g.

In addition, the average particle diameter of $E^5$ was 2.3 µm and the average primary particle diameter was 0.18 µm.

When a powder X-ray diffraction measurement of $E^5$ was carried out, a diffraction peak was present at $2\theta=20.8°$. In addition, the crystal structure of $E^5$ belonged to a space group of C2/m.

3. The Charge and Discharge Test of a Non-Aqueous Electrolyte Secondary Battery

A coin-type battery was produced using $E^5$, and a charge and discharge test was carried out. The charge capacity (mAh/g) was 316, the discharge capacity (mAh/g) was 289, and the initial coulomb efficiency (%) was 91.5.

Example 6

1. Production of a Precursor (Co-Precipitate) of a Lithium Composite Metal Oxide The same operation as in Example 3 except that nickel sulfate hexahydrate, manganese sulfate hydrate, and cobalt sulfate heptahydrate were weighed respectively so that the molar ratio of Ni:Mn:Co reached 0.28:0.48:0.24 was carried out, thereby obtaining a co-precipitate $F^6$.

2. Production and Evaluation of a Lithium Composite Metal Oxide

The same operation as in Example 1 except that lithium carbonate was weighed so that the amount (mole) of Li reached 1.3 times the total amount (mole) of Ni, Mn, and Co contained in the obtained co-precipitate $F^6$ was carried out, thereby obtaining a lithium composite metal oxide $E^6$.

As a result of analyzing the composition of the obtained $E^6$, the molar ratio of Li:Ni:Mn:Co contained in $E^6$ was 1.13:0.28:0.48:0.24.

In addition, the BET specific surface area of $E^6$ was 11.2 m²/g.

In addition, the average particle diameter of $E^6$ was 0.6 µm and the average primary particle diameter was 0.19 µm.

When a powder X-ray diffraction measurement of $E^6$ was carried out, a diffraction peak was present at $2\theta=20.8°$. In addition, the crystal structure of $E^6$ belonged to a space group of R-3m.

3. The Charge and Discharge Test of a Non-Aqueous Electrolyte Secondary Battery

A coin-type battery was produced using $E^6$, and a charge and discharge test was carried out. The charge capacity (mAh/g) was 263, the discharge capacity (mAh/g) was 220, and the initial coulomb efficiency (%) was 83.7.

Example 7

1. Production and Evaluation of a Lithium Composite Metal Oxide

The same operation as in Example 1 except that firing was carried out at 900° C. was carried out, thereby obtaining a lithium composite metal oxide $E^7$.

As a result of analyzing the composition of the obtained $E^7$, the molar ratio of Li:Ni:Mn contained in $E^7$ was 1.28:0.27:0.73.

In addition, the BET specific surface area of $E^7$ was 23.4 m²/g.

In addition, the average particle diameter of $E^7$ was 2.8 µm, and the average primary particle diameter was 0.13 µm.

When a powder X-ray diffraction measurement of $E^7$ was carried out, a diffraction peak was present at $2\theta=20.8°$. In addition, the crystal structure of $E^7$ belonged to a space group of C2/m.

2. The Charge and Discharge Test of a Non-Aqueous Electrolyte Secondary Battery

A coin-type battery was produced using $E^7$, and a charge and discharge test was carried out. The charge capacity (mAh/g) was 263, the discharge capacity (mAh/g) was 222, and the initial coulomb efficiency (%) was 84.4.

Example 8

1. Production and Evaluation of a Lithium Composite Metal Oxide

The same operation as in Example 2 except that calcining was carried out at 900° C. was carried out, thereby obtaining a lithium composite metal oxide $E^8$.

As a result of analyzing the composition of the obtained $E^8$, the molar ratio of Li:Ni:Mn contained in $E^8$ was 1.25:0.43:0.57.

In addition, the BET specific surface area of $E^8$ was 9.4 $m^2/g$.

In addition, the average particle diameter of $E^8$ was 0.7 and the average primary particle diameter was 0.19

When a powder X-ray diffraction measurement of $E^8$ was carried out, a diffraction peak was present at $2\theta=20.8°$. In addition, the crystal structure of $E^8$ belonged to a space group of C2/m.

2. The Charge and Discharge Test of a Non-Aqueous Electrolyte Secondary Battery

A coin-type battery was produced using $E^8$, and a charge and discharge test was carried out. The charge capacity (mAh/g) was 281, the discharge capacity (mAh/g) was 235, and the initial coulomb efficiency (%) was 83.6.

Example 9

1. Production and Evaluation of a Lithium Composite Metal Oxide

The same operation as in Example 3 except that calcining was carried out at 900° C. was carried out, thereby obtaining a lithium composite metal oxide $E^9$.

As a result of analyzing the composition of the obtained $E^9$, the molar ratio of Li:Ni:Mn:Co contained in $E^9$ was 1.25:0.23:0.68:0.09.

In addition, the BET specific surface area of $E^9$ was 13.0 $m^2/g$.

In addition, the average particle diameter of $E^9$ was 2.6 μm, and the average primary particle diameter was 0.17 μm.

When a powder X-ray diffraction measurement of $E^9$, a diffraction peak was present at $2\theta=20.8°$. In addition, the crystal structure of $E^9$ belonged to a space group of C2/m.

2. The Charge and Discharge Test of a Non-Aqueous Electrolyte Secondary Battery

A coin-type battery was produced using $E^9$, and a charge and discharge test was carried out. The charge capacity (mAh/g) was 335, the discharge capacity (mAh/g) was 283, and the initial coulomb efficiency (%) was 84.5.

Example 10

1. Production and Evaluation of a Lithium Composite Metal Oxide

The same operation as in Example 4 except that calcining was carried out at 900° C. was carried out, thereby obtaining a lithium composite metal oxide $E^{10}$.

As a result of analyzing the composition of the obtained $E^{10}$, the molar ratio of Li:Ni:Mn:Co contained in $E^{10}$ was 1.11:0.34:0.53:0.13.

In addition, the BET specific surface area of $E^{10}$ was 7.4 $m^2/g$.

In addition, the average particle diameter of $E^{10}$ was 0.3 μm, and the average primary particle diameter was 0.20 μm.

When a powder X-ray diffraction measurement of $E^{10}$ was carried out, a diffraction peak was present at $2\theta=20.8°$. In addition, the crystal structure of $E^{10}$ belonged to a space group of R-3m.

2. The Charge and Discharge Test of a Non-Aqueous Electrolyte Secondary Battery

A coin-type battery was produced using $E^{10}$, and a charge and discharge test was carried out. The charge capacity (mAh/g) was 262, the discharge capacity (mAh/g) was 221, and the initial coulomb efficiency (%) was 84.4.

Example 11

1. Production and Evaluation of a Lithium Composite Metal Oxide

The same operation as in Example 5 except that calcining was carried out at 900° C. was carried out, thereby obtaining a lithium composite metal oxide $E^{11}$.

As a result of analyzing the composition of the obtained $E^{11}$, the molar ratio of Li:Ni:Mn:Co contained in $E^{11}$ was 1.28:0.19:0.66:0.15.

In addition, the BET specific surface area of $E^{11}$ was 11.7 $m^2/g$.

In addition, the average particle diameter of $E^{11}$ was 2.6 μm, and the average primary particle diameter was 0.21 μm.

When a powder X-ray diffraction measurement of $E^{11}$ was carried out, a diffraction peak was present at $2\theta=20.8°$. In addition, the crystal structure of $E^{11}$ belonged to a space group of C2/m.

2. The Charge and Discharge Test of a Non-Aqueous Electrolyte Secondary Battery

A coin-type battery was produced using $E^{11}$, and a charge and discharge test was carried out. The charge capacity (mAh/g) was 323, the discharge capacity (mAh/g) was 284, and the initial coulomb efficiency (%) was 87.9.

Comparative Example 1

1. Production and Evaluation of a Lithium Composite Metal Oxide

The same operation as in Example 6 except that calcining was carried out at 900° C. was carried out, thereby obtaining a lithium composite metal oxide $C^1$.

As a result of analyzing the composition of the obtained $C^1$, the molar ratio of Li:Ni:Mn:Co contained in $C^1$ was 1.18:0.28:0.47:0.25.

In addition, the BET specific surface area of $C^1$ was 4.8 $m^2/g$.

In addition, the average particle diameter of $C^1$ was 1.6 μm, and the average primary particle diameter was 0.25 μm.

When a powder X-ray diffraction measurement of $C^1$ was carried out, a diffraction peak was present at $2\theta=20.8°$. In addition, the crystal structure of $C^1$ belonged to a space group of R-3m.

2. The Charge and Discharge Test of a Non-Aqueous Electrolyte Secondary Battery

A coin-type battery was produced using $C^1$, and a charge and discharge test was carried out. The charge capacity (mAh/g) was 271, the discharge capacity (mAh/g) was 211, and the initial coulomb efficiency (%) was 77.9.

Comparative Example 2

1. Production of a Precursor (Co-Precipitate) of a Lithium Composite Metal Oxide The same operation as in Example 3 except that nickel sulfate hexahydrate, manganese sulfate hydrate, and cobalt sulfate heptahydrate were weighed respectively so that the molar ratio of Ni:Mn:Co reached 0.05:0.90:0.05 was carried out, thereby obtaining a co-precipitate $D^2$.

2. Production and Evaluation of a Lithium Composite Metal Oxide

The same operation as in Example 1 except for the fact that lithium carbonate was weighed so that the amount (mole) of Li reached 1.9 times the total amount (mole) of Ni, Mn, and Co contained in the obtained co-precipitate $D^2$ was carried out, thereby obtaining a lithium composite metal oxide $C^2$.

As a result of analyzing the composition of the obtained $C^2$, the molar ratio of Li:Ni:Mn:Co contained in $C^2$ was 1.78:0.05:0.90:0.05.

In addition, the BET specific surface area of $C^2$ was 5.0 $m^2/g$.

In addition, the average particle diameter of $C^2$ was 0.2 μm, and the average primary particle diameter was 0.12 μm.

When a powder X-ray diffraction measurement of $C^2$ was carried out, a diffraction peak was present at 2θ=20.8°. In addition, the crystal structure of $C^2$ belonged to a space group of C2/m.

3. The Charge and Discharge Test of a Non-Aqueous Electrolyte Secondary Battery

A coin-type battery was produced using $C^2$, and a charge and discharge test was carried out. The charge capacity (mAh/g) was 245, the discharge capacity (mAh/g) was 140, and the initial coulomb efficiency (%) was 57.1.

Comparative Example 3

1. Production of a Precursor (Co-Precipitate) of a Lithium Composite Metal Oxide The same operation as in Example 3 except that nickel sulfate hexahydrate, manganese sulfate hydrate, and cobalt sulfate heptahydrate were weighed respectively so that the molar ratio of Ni:Mn:Co reached 0.10:0.80:0.10 was carried out, thereby obtaining a co-precipitate $D^3$.

2. Production and Evaluation of a Lithium Composite Metal Oxide

The same operation as in Example 1 except for the fact that lithium carbonate was weighed so that the amount (mole) of Li reached 1.8 times the total amount (mole) of Ni, Mn, and Co contained in the obtained co-precipitate $D^3$ was carried out, thereby obtaining a lithium composite metal oxide $C^3$.

As a result of analyzing the composition of the obtained $C^3$, the molar ratio of Li:Ni:Mn:Co contained in $C^2$ was 1.76:0.09:0.82:0.09.

In addition, the BET specific surface area of $C^3$ was 5.1 $m^2/g$.

In addition, the average particle diameter of $C^3$ was 1.0 μm, and the average primary particle diameter was 0.15 μm.

When a powder X-ray diffraction measurement of $C^3$ was carried out, a diffraction peak was present at 2θ=20.8°. In addition, the crystal structure of $C^3$ belonged to a space group of C2/m.

3. The Charge and Discharge Test of a Non-Aqueous Electrolyte Secondary Battery

A coin-type battery was produced using $C^3$, and a charge and discharge test was carried out. The charge capacity (mAh/g) was 343, the discharge capacity (mAh/g) was 200, and the initial coulomb efficiency (%) was 58.3.

Comparative Example 4

1. Production of a Precursor (Co-Precipitate) of a Lithium Composite Metal Oxide The same operation as in Example 3 except that nickel sulfate hexahydrate, manganese sulfate hydrate, and cobalt sulfate heptahydrate were weighed respectively so that the molar ratio of Ni:Mn:Co reached 0.13:0.74:0.13 was carried out, thereby obtaining a co-precipitate $D^4$.

2. Production and Evaluation of a Lithium Composite Metal Oxide

The same operation as in Example 1 except that lithium carbonate was weighed so that the amount (mole) of Li reached 1.7 times the total amount (mole) of Ni, Mn, and Co contained in the obtained co-precipitate $D^4$ was carried out, thereby obtaining a lithium composite metal oxide $C^4$.

As a result of analyzing the composition of the obtained $C^4$, the molar ratio of Li:Ni:Mn:Co contained in $C^4$ was 1.60:0.13:0.74:0.13.

In addition, the DET specific surface area of $C^4$ was 4.8 $m^2/g$.

In addition, the average particle diameter of $C^4$ was 0.2 μm, and the average primary particle diameter was 0.19 μm.

When a powder X-ray diffraction measurement of $C^4$, a diffraction peak was present at 2θ=20.8°. In addition, the crystal structure of $C^4$ belonged to a space group of C2/m.

3. The Charge and Discharge Test of a Non-Aqueous Electrolyte Secondary Battery

A coin-type battery was produced using $C^2$, and a charge and discharge test was carried out. The charge capacity (mAh/g) was 357, the discharge capacity (mAh/g) was 242, and the initial coulomb efficiency (%) was 67.8.

Comparative Example 5

1. Production and Evaluation of a Lithium Composite Metal Oxide

The same operation as in Example 1 except that lithium carbonate was weighed so that the amount (mole) of Li reached 2.0 times the total amount (mole) of Ni and Mn contained in the obtained co-precipitate $F^2$ and firing was carried out at 800° C. was carried out, thereby obtaining a lithium composite metal oxide $C^5$.

As a result of analyzing the composition of the obtained $C^5$, the molar ratio of Li:Ni:Mn contained in $C^5$ was 1.40:0.41:0.59.

In addition, the BET specific surface area of $C^5$ was 33.2 $m^2/g$.

In addition, the average particle diameter of $C^5$ was 0.2 μm, and the average primary particle diameter was 0.12 μm.

When a powder X-ray diffraction measurement of $C^5$ was carried out, a diffraction peak was present at 2θ=20.8°. In addition, the crystal structure of $C^5$ belonged to a space group of C2/m.

3. The Charge and Discharge Test of a Non-Aqueous Electrolyte Secondary Battery

A coin-type battery was produced using $C^5$, and a charge and discharge test was carried out. The charge capacity (mAh/g) was 328, the discharge capacity (mAh/g) was 229, and the initial coulomb efficiency (%) was 69.8.

The property values of the lithium composite metal oxides used in Examples 1 to 11 and Comparative Examples 1 to 5 are described in Table 1.

In addition, for the non-aqueous electrolyte secondary batteries produced in Examples 1 to 11 and Comparative Examples 1 to 5, the results of the charge and discharge tests are described in Table 2.

Regarding the results of the charge and discharge tests, from the viewpoint of the object of the present invention of obtaining a non-aqueous electrolyte secondary battery exhibiting a high discharge capacity, non-aqueous electrolyte secondary batteries having a discharge capacity of 220 mAh/g or more were evaluated to be favorable. In addition, from the viewpoint of the object of the present invention of obtaining a non-aqueous electrolyte secondary battery exhibiting a high initial coulomb efficiency, non-aqueous electrolyte secondary batteries having an initial coulomb efficiency of 80% or more were evaluated to be favorable.

Non-aqueous electrolyte secondary batteries that could be evaluated to be favorable in terms of both the discharge capacity and the initial coulomb efficiency as a result of the evaluations were determined to be comprehensively favorable.

In Table 2, "O" indicates favorable characteristics, and "X" indicate poor characteristics.

as the positive electrode active materials, a high discharge capacity and a high initial coulomb efficiency were exhibited, and high-performance secondary batteries could be obtained.

On the contrary, in the non-aqueous electrolyte secondary batteries for which the lithium composite metal oxides obtained in Comparative Examples 1 to 3 were used as the positive electrode active materials, the discharge capacity and the initial coulomb efficiency were not sufficient.

In addition, in the non-aqueous electrolyte secondary batteries for which the lithium composite metal oxides

TABLE 1

|  | Compositional ratio | | | | Crystal structure | X-ray diffraction peak position | BET specific surface area | Average particle diameter | Average primary particle diameter | Firing temperature |
| --- | --- | --- | --- | --- | --- | --- | --- | --- | --- | --- |
|  | Li/A | Ni/A | Mn/A | Co/A | (space group) | (2θ, °) | (m²/g) | (μm) | (μm) | (° C.) |
| Example 1 | 1.30 | 0.27 | 0.73 | — | Lamellar (C2/m) | 20.8 | 26.1 | 2.3 | 0.15 | 850 |
| Example 2 | 1.14 | 0.42 | 0.58 | — | Lamellar (R3-m) | 20.8 | 15.7 | 1.7 | 0.18 | 850 |
| Example 3 | 1.29 | 0.24 | 0.68 | 0.08 | Lamellar (C2/m) | 20.8 | 21.2 | 3.3 | 0.13 | 850 |
| Example 4 | 1.19 | 0.34 | 0.53 | 0.13 | Lamellar (C2/m) | 20.8 | 13.4 | 2.8 | 0.18 | 850 |
| Example 5 | 1.36 | 0.20 | 0.65 | 0.15 | Lamellar (C2/m) | 20.8 | 16.3 | 2.3 | 0.18 | 850 |
| Example 6 | 1.13 | 0.28 | 0.48 | 0.24 | Lamellar (R3-m) | 20.8 | 11.2 | 0.6 | 0.19 | 850 |
| Example 7 | 1.28 | 0.27 | 0.73 | — | Lamellar (C2/m) | 20.8 | 23.4 | 2.8 | 0.13 | 900 |
| Example 8 | 1.25 | 0.43 | 0.57 | — | Lamellar (C2/m) | 20.8 | 9.4 | 0.7 | 0.19 | 900 |
| Example 9 | 1.25 | 0.23 | 0.68 | 0.09 | Lamellar (C2/m) | 20.8 | 13.0 | 2.6 | 0.17 | 900 |
| Example 10 | 1.11 | 0.34 | 0.53 | 0.13 | Lamellar (R3-m) | 20.8 | 7.4 | 0.3 | 0.20 | 900 |
| Example 11 | 1.28 | 0.19 | 0.66 | 0.15 | Lamellar (C2/m) | 20.8 | 11.7 | 2.6 | 0.21 | 900 |
| Comparative Example 1 | 1.18 | 0.28 | 0.47 | 0.25 | Lamellar (R3-m) | 20.8 | 4.8 | 1.6 | 0.25 | 900 |
| Comparative Example 2 | 1.78 | 0.05 | 0.91 | 0.05 | Lamellar (C2/m) | 20.8 | 5.0 | 0.2 | 0.12 | 850 |
| Comparative Example 3 | 1.76 | 0.09 | 0.82 | 0.09 | Lamellar (C2/m) | 20.8 | 5.1 | 1.0 | 0.15 | 850 |
| Comparative Example 4 | 1.60 | 0.13 | 0.74 | 0.13 | Lamellar (C2/m) | 20.8 | 4.8 | 0.2 | 0.19 | 850 |
| Comparative Example 5 | 1.40 | 0.41 | 0.59 | — | Lamellar (C2/m) | 20.8 | 33.2 | 0.2 | 0.12 | 800 |

* A = Ni + Mn + Co

TABLE 2

|  | Charge capacity | Discharge capacity | | Coulomb efficiency | | Comprehensive evaluation |
| --- | --- | --- | --- | --- | --- | --- |
|  | (mAh/g) | (mAh/g) | Result | (%) | Result |  |
| Example 1 | 283 | 233 | O | 82.3 | O | O |
| Example 2 | 272 | 235 | O | 86.4 | O | O |
| Example 3 | 332 | 288 | O | 86.7 | O | O |
| Example 4 | 266 | 230 | O | 86.5 | O | O |
| Example 5 | 316 | 289 | O | 91.5 | O | O |
| Example 6 | 263 | 220 | O | 83.7 | O | O |
| Example 7 | 263 | 222 | O | 84.4 | O | O |
| Example 8 | 281 | 235 | O | 83.6 | O | O |
| Example 9 | 335 | 283 | O | 84.5 | O | O |
| Example 10 | 262 | 221 | O | 84.4 | O | O |
| Example 11 | 323 | 284 | O | 87.9 | O | O |
| Comparative Example 1 | 271 | 211 | X | 77.9 | X | X |
| Comparative Example 2 | 245 | 140 | X | 57.1 | X | X |
| Comparative Example 3 | 343 | 200 | X | 58.3 | X | X |
| Comparative Example 4 | 357 | 242 | O | 67.8 | X | X |
| Comparative Example 5 | 328 | 229 | O | 69.8 | X | X |

As a result of the measurements, in all the non-aqueous electrolyte secondary batteries for which the lithium composite metal oxides obtained in Examples 1 to 11 were used obtained in Comparative Examples 4 and 5 were used as the positive electrode active materials, the high initial coulomb efficiency was not sufficient.

The above-described results clarify the usefulness of the present invention.

INDUSTRIAL APPLICABILITY

According to the present invention, it is possible to provide a lithium composite metal oxide used in a non-aqueous electrolyte secondary battery capable of exhibiting a high discharge capacity and a high initial coulomb efficiency. In addition, it is possible to provide a positive electrode active material, a positive electrode, and a non-aqueous electrolyte secondary battery for which the above-described lithium composite metal oxide is used.

The invention claimed is:
1. A lithium composite metal oxide which
    contains Li, Ni, and Mn,
    has a lamellar structure,
    has a diffraction peak in a range of 2θ=20.8±1° in a powder X-ray diffraction pattern obtained through powder X-ray diffraction measurement using a Cu—Kα radiation,
    has a BET specific surface area of from 6 m²/g to 30 m²/g, and has an average particle diameter measured by a laser diffraction scattering method of from 0.1 μm to 10 μm, and wherein the lithium composite metal oxide is represented by Formula (B) described below $$nLi_{2b/3}MnO_3 \cdot (1-n)Li_{b/3}Ni_{1-p-q}Mn_pM_qO_2 \quad (B),$$

wherein in Formula (B) $0.2 \leq n \leq 0.6$, $2.75 \leq b < 3.0$, $0.25 \leq p \leq 0.5$, $0 \leq q \leq 0.31$, $0.38 \leq p+q \leq 0.5$, and M represents one or more elements selected from the group consisting of Co, Fe, Mg, Al, and Ca.

2. The lithium composite metal oxide according to claim 1, wherein an average primary particle diameter of the lithium composite metal oxide is from 0.05 μm to 0.3 μm.

3. The lithium composite metal oxide according to claim 1, wherein M represents one or more elements selected from the group consisting of Co and Fe.

4. A positive electrode active material comprising: the lithium composite metal oxide according to claim 1.

5. A positive electrode comprising: the positive electrode active substance according to claim 4.

6. A non-aqueous electrolyte secondary battery comprising: a negative electrode and the positive electrode according to claim 5.

7. The non-aqueous electrolyte secondary battery according to claim 6, wherein a charge potential of the positive electrode in a fully charged state is 4.35 V (vs. Li/Li$^+$) or more.

* * * * *